US006527296B2

(12) United States Patent
Bakhsh et al.

(10) Patent No.: US 6,527,296 B2
(45) Date of Patent: Mar. 4, 2003

(54) INFLATABLE SIDE CURTAIN (75) Inventors: Ali Emam Bakhsh, Rochester Hills, MI (US); Rico Scott Bertossi, Richmond, MI (US); Ayad G. Nayef, Sterling Heights, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/963,289

(22) Filed: Sep. 26, 2001

(65) Prior Publication Data

US 2002/0036394 A1 Mar. 28, 2002

Related U.S. Application Data (63) Continuation-in-part of application No. 09/946,287, filed on Sep. 5, 2001, now Pat. No. 6,431,590, which is a continuation of application No. 09/672,547, filed on Sep. 28, 2000, now abandoned, and a continuation-in-part of application No. 09/956,227, filed on Sep. 19, 2001, which is a continuation of application No. 09/579,162, filed on May 25, 2000, now abandoned.
(60) Provisional application No. 60/190,199, filed on Mar. 17, 2000.

(51) Int. Cl.⁷ .............................................. B60R 21/22
(52) U.S. Cl. ................... 280/730.2; 280/743.1
(58) Field of Search ........................... 280/729, 730.1, 280/730.2, 736, 742, 743.1

(56) References Cited

U.S. PATENT DOCUMENTS

| 3,731,949 A | 5/1973 | Radke |
| 5,427,410 A | 6/1995 | Shiota et al. |
| 5,439,247 A | 8/1995 | Kolb |
| 5,524,924 A | 6/1996 | Steffens, Jr. et al. |
| 5,588,672 A | 12/1996 | Karlow et al. |
| 5,730,463 A | 3/1998 | Fisher et al. |
| 5,788,270 A | 8/1998 | Haland et al. |
| 5,865,462 A | 2/1999 | Robins et al. |
| 5,884,937 A | 3/1999 | Yamada |
| 5,899,490 A | 5/1999 | Wipasuramonton et al. |
| 5,899,491 A | 5/1999 | Tschaeschke |
| 5,924,723 A | 7/1999 | Brantmann et al. |
| 5,957,487 A | 9/1999 | Stutz |
| 5,960,611 A | 10/1999 | Aigner et al. |
| 6,010,149 A | 1/2000 | Reidel et al. |
| 6,032,977 A | 3/2000 | Reh et al. |
| 6,056,316 A | 5/2000 | Yamaji et al. |

(List continued on next page.)

FOREIGN PATENT DOCUMENTS

| DE | 4134995 | 3/1993 |
| DE | 4307175 | 9/1993 |
| DE | 19743626 | 4/1998 |
| DE | 299 14 637 | 1/2000 |
| GB | 2 314 300 | 12/1997 |

Primary Examiner—Paul N. Dickson
Assistant Examiner—David R. Dunn
(74) Attorney, Agent, or Firm—Tarolli, Sundheim, Covell & Tummino L.L.P.

(57) ABSTRACT

An inflatable protection device (14) includes a triangular front portion (64) and a main portion (62). The front portion (64) includes a forward edge (72), a rear edge (76), and a bottom edge (74). The front portion (64) is connected to the main portion (62) via a first inflation fluid passage (106) positioned adjacent the bottom edge (74). The front portion (64) includes a plurality of inflatable chambers (120) that have a tapered configuration with a narrow end (134) and an opposite wide end (136) positioned near the bottom edge (74). Inflation fluid is directed into the main portion (62), and the fluid enters the front portion (62) through the first inflation fluid passage (106). The chambers (120) of the front portion (64) when inflated contract in a direction transverse to the length of the chambers and help to tension the device (14) along the length of the device.

29 Claims, 4 Drawing Sheets

U.S. PATENT DOCUMENTS

| | | |
|---|---|---|
| 6,073,961 A | 6/2000 | Bailey et al. |
| 6,082,761 A | 7/2000 | Kato et al. |
| 6,135,492 A | 10/2000 | Zimmerbeutel et al. |
| 6,155,596 A | 12/2000 | Nakajima et al. |
| 6,168,191 B1 | 1/2001 | Webber et al. |
| 6,170,860 B1 | 1/2001 | Denz et al. |
| 6,186,534 B1 | 2/2001 | Heinz |
| 6,199,898 B1 | 3/2001 | Masuda et al. |
| 6,220,625 B1 | 4/2001 | Wallner et al. |
| 6,237,937 B1 | 5/2001 | Kokeguchi et al. |
| 6,244,619 B1 * | 6/2001 | Satzger .................... 280/730.2 |
| 6,250,668 B1 | 6/2001 | Breed et al. |
| 6,273,456 B1 * | 8/2001 | Heigl ...................... 280/730.2 |
| 6,336,654 B1 * | 1/2002 | Stein et al. .............. 280/730.2 |
| 6,338,498 B1 * | 1/2002 | Niederman et al. ...... 280/728.2 |
| 6,394,487 B1 * | 5/2002 | Heudorfer et al. .......... 280/729 |

* cited by examiner

INFLATABLE SIDE CURTAIN

RELATED APPLICATIONS

This application is a continuation-in-part of U.S. patent application Ser. No. 09/946,287, filed Sep. 5, 2001 now U.S. Pat. No. 6,431,590, which is a continuation of U.S. patent application Ser. No. 09/672,547, filed Sep. 28, 2000, now abandoned, and a continuation-in-part of U.S. patent application Ser. No. 09/956,227, filed Sep. 19, 2001, which is a continuation of U.S. patent application Ser. No. 09/579,162, filed May 25, 2000, now abandoned, which is based on Provisional U.S. Application Ser. No. 60/190,199, filed Mar. 17, 2000.

FIELD OF THE INVENTION

The present invention relates to an apparatus for helping to protect an occupant of a vehicle in the event of a side impact to the vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates from the roof of the vehicle downward inside the passenger compartment in the event of a side impact or a vehicle rollover. The inflatable curtain, when inflated, is positioned between a vehicle occupant and the side structure of the vehicle. A known inflatable curtain is inflated by inflation fluid directed from an inflator to the inflatable curtain through a fill tube.

SUMMARY OF THE INVENTION

The present invention relates to an apparatus for helping to protect an occupant of a vehicle that has a side structure and a roof. The apparatus includes an inflatable vehicle occupant protection device that is inflatable away from the vehicle roof into a position between the side structure of the vehicle and a vehicle occupant.

The inflatable vehicle occupant protection device includes an inflatable front portion having a generally triangular configuration and an inflatable main portion positioned rearward of the front portion. The front portion includes a forward edge, a rear edge, and a bottom edge. The front portion is in fluid communication with the main portion via a first inflation fluid passage positioned adjacent the bottom edge of the front portion.

The front portion includes a plurality of inflatable chambers. The chambers have a generally tapered configuration with a narrow end and an opposite wide end. The narrow end is positioned near an intersection of the forward edge and the rear edge of the front portion. The wide end is positioned near the bottom edge of the front portion.

The apparatus also includes an inflation fluid source that is actuatable to provide inflation fluid for inflating the inflatable vehicle occupant protection device. The inflation fluid source when actuated directs inflation fluid into the main portion to inflate the main portion. The first inflation fluid passage directs inflation fluid from the main portion into the front portion to inflate the front portion. The chambers of the front portion when inflated contract in a direction transverse to the length of the chambers and help to tension the inflatable vehicle occupant protection device along the length of the inflatable vehicle occupant protection device.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF PREFERRED EMBODIMENTS

Figure 1:
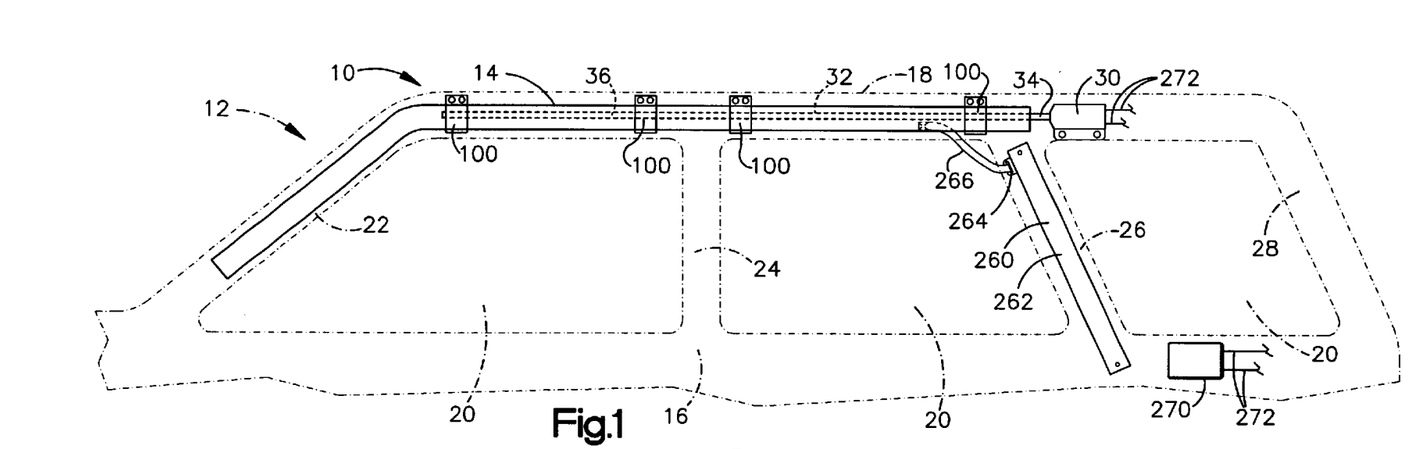
FIG. 1 is a schematic view illustrating an apparatus for helping to protect a vehicle occupant in a deflated condition, according to a first embodiment of the present invention.
Figure 2:
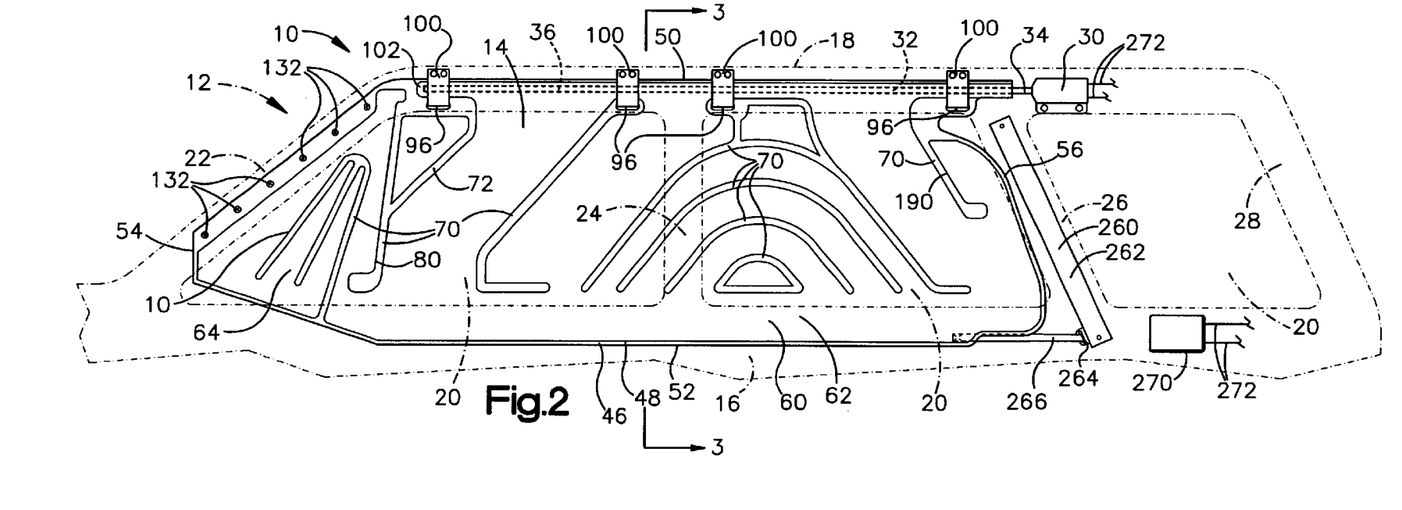
FIG. 2 is a schematic view of the apparatus of FIG. 1 in an inflated condition.

As representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent the side structure 16 of the vehicle 12 and a roof 18 of the vehicle. The roof 18 may be either a standard roof that is fixed in place or a convertible roof that can be moved or removed. The side structure 16 of the vehicle 12 includes side windows 20, an A pillar 22, a B pillar 24, and a C pillar 26. The side structure 16 may also include a D pillar 28. An inflator 30 is connected in fluid communication with the inflatable curtain 14 through a fill tube 32.

The fill tube 32 has a first end portion 34 for receiving fluid from the inflator 30. The fill tube 32 has a second end portion 36 disposed in the inflatable curtain 14. The second end portion 36 of the fill tube 32 has a plurality of openings (not shown) that provide fluid communication between the fill tube 32 and the inflatable curtain 14.

The inflator 30 contains a stored quantity of pressurized inflation fluid (not shown) in the form of a gas for inflating the inflatable curtain 14. The inflator 30 alternatively could contain a combination of pressurized inflation fluid and ignitable material for heating the inflation fluid, or could be a pyrotechnic inflator that uses the combustion of gas-generating material to generate inflation fluid. As a further alternative, the inflator 30 could be of any suitable type or construction for supplying a medium for inflating the inflatable curtain 14.

The apparatus 10 has a stored condition in which the inflatable curtain 14 is stored in a deflated condition. This is illustrated in FIG. 1. When the apparatus 10 is in the stored condition, the deflated inflatable curtain 14 has an elongated configuration and extends along the vehicle roof 18 and along the side structure 16 of the vehicle 12 above the side windows 20. A portion of the apparatus 10 of FIG. 1 extends along the A pillar 22 of the vehicle 12 when the apparatus is in the stored position. The apparatus 10 may include a housing (not shown) that houses the inflatable curtain 14 in the stored condition.

Figure 3:
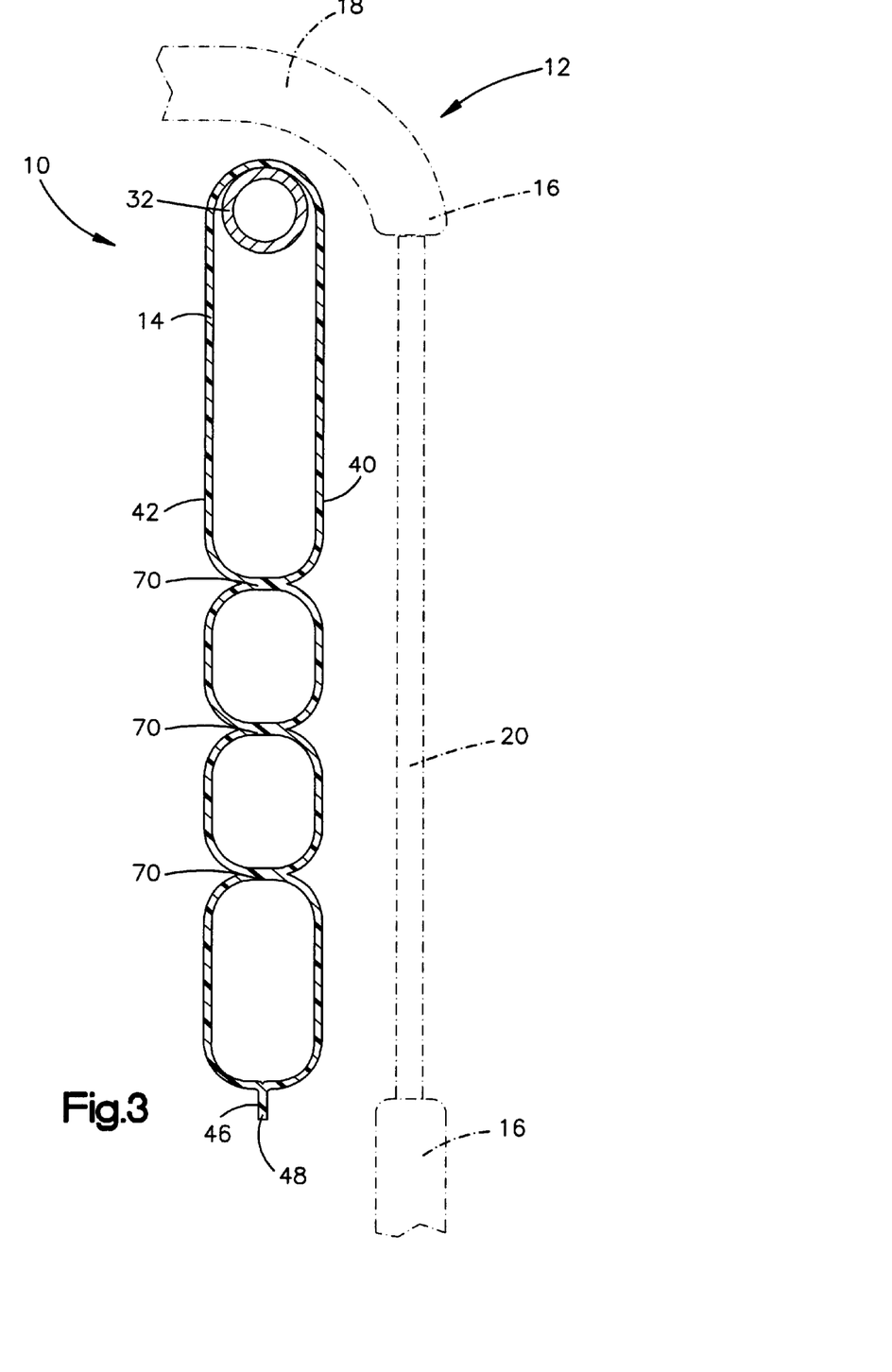
FIG. 3 is a sectional view of the apparatus taken generally along line 3—3 in FIG. 2.

Referring to FIG. 3, the inflatable curtain 14 comprises first and second panels 40 and 42 that are arranged in an overlying manner. The first and second panels 40 and 42 are interconnected to form a perimeter connection 46 (FIGS. 2 and 3) that extends along a perimeter 48 of the panels. The first and second panels 40 and 42 are also interconnected to form connections 70 within the perimeter 48 of the inflatable curtain 14.

In a preferred construction of the inflatable curtain 14, the perimeter connection 46 and the connections 70 are formed by weaving the panels 40 and 42 together. In an alternative construction of the inflatable curtain 14, means such as stitching, dielectric sealing, ultrasonic bonding, heat sealing, and adhesives may be used to interconnect the first and second panels 40 and 42 in order to form the perimeter connection 46 and the connections 70.

In the preferred construction of the inflatable curtain 14, the curtain is formed by weaving the first and second panels 40 and 42 simultaneously while also interweaving the perimeter connection 46 and the connections 70 as single layers of fabric. This can be accomplished by using a Jacquard or Dobby weaving machine. The weaving machines are pre-programmed to weave the first and second panels 40 and 42 along with the perimeter connection 46 and connections 70 at the same time. No intermediate steps are required.

In an alternative construction of the inflatable curtain 14, the curtain may be formed by interconnecting two separate fabric pieces together along the perimeter connection 46 and the connections 70. As a further alternative, a single piece of fabric may be folded over to form the overlying first and second panels 40 and 42. In this latter alternative, the fold is part of the perimeter connection 46 of the inflatable curtain 14.

Preferably, the inflatable curtain 14 is constructed of a woven fabric, such as nylon, that is coated with a gas impermeable material, such as urethane or silicone. The inflatable curtain 14 thus may have a substantially gas-tight construction. Other materials, such as elastomers, plastic films, or combinations thereof, may also be used to construct the inflatable curtain 14, in which case the curtain may have a non-woven construction. The materials used to construct the inflatable curtain 14 may also be single or multi-layered materials.

The first and second panels 40 and 42, the perimeter connection 46, and the connections 70 may be coated using a laminate film, slurry, and/or a spray coating, such as silicone, urethane, or other known suitable materials, in order to achieve a substantially gas-tight construction. This helps to prevent gas from permeating directly through the first and second panels 40 and 42, the perimeter connection 46, and the connections 70.

The perimeter 48 (FIG. 2) of the inflatable curtain 14 is defined by upper and lower edges 50 and 52, respectively, of the curtain and front and rear edges 54 and 56, respectively, of the curtain that are spaced apart horizontally along the upper and lower edges. The perimeter connection 46 (FIG. 2) defines an inflatable volume 60 of the inflatable curtain 14.

Figure 4:
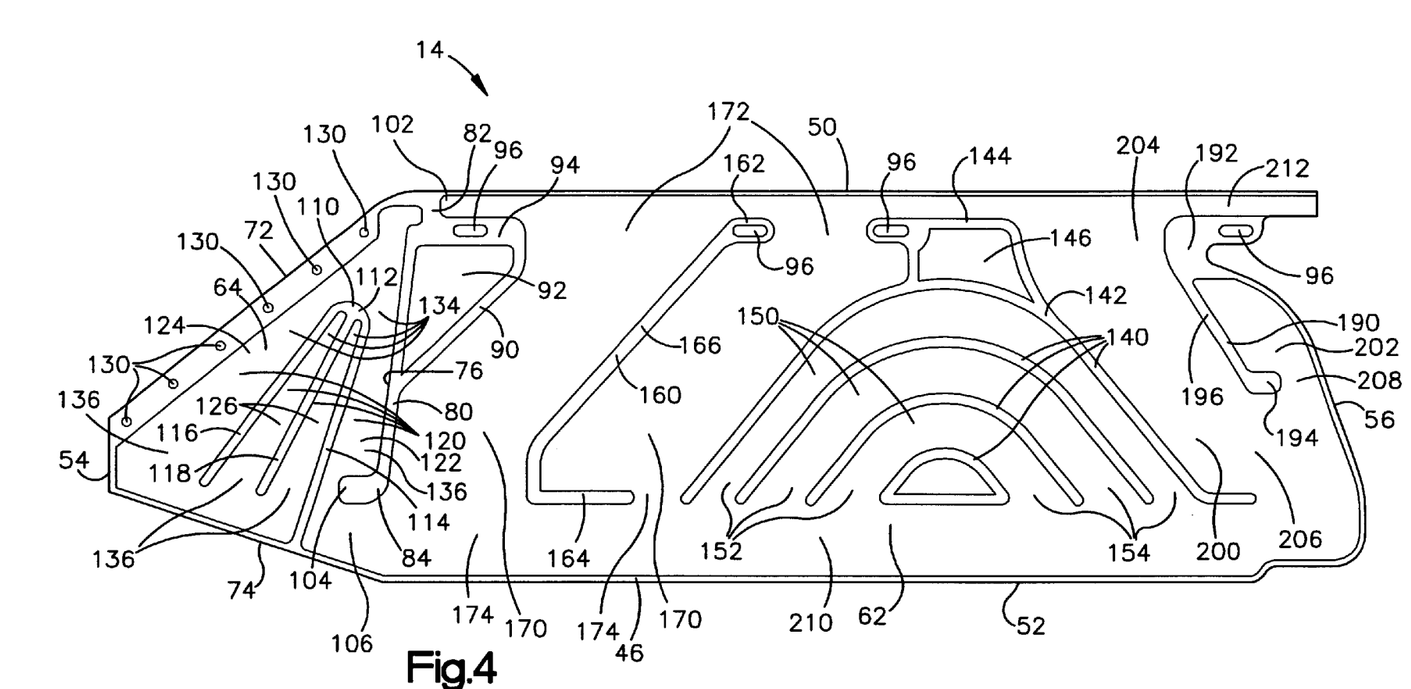
FIG. 4 is a schematic view of a portion of the apparatus of FIG. 2.

Referring to FIG. 4, the inflatable curtain 14 includes an inflatable main portion 62 partially defined by the upper edge 50, lower edge 52, and rear edge 56 of the curtain. The main portion 62 extends from the upper edge 50 to the lower edge 52. The main portion 62 is further defined by a first connection 80 of the inflatable curtain 14. The first connection 80 has a first end portion 82 that intersects the perimeter connection 46 adjacent the upper edge 50 of the inflatable curtain 14. The first connection 80 extends in a generally vertical direction from the upper edge 50 of the inflatable curtain 14 towards the lower edge 52 of the curtain. The first connection 80 has a second end 84, opposite the first end 82, spaced from the perimeter connection 46 and positioned near the lower edge 52.

The inflatable curtain 14 also includes an inflatable front portion 64 partially defined by the upper edge 50, lower edge 52, front edge 54, and first connection 80. The front portion 64 has a generally triangular configuration. As illustrated in FIG. 2, the upper and lower edges 50 and 52 have portions that extend at an angle towards each other in the front portion 64 of the inflatable curtain 14. The angled portion of the upper edge 50 forms a forward edge 72 of the front portion 64. The angled portion of the lower edge 52 forms a bottom edge 74 of the front portion 64. The first connection 80 forms a rear edge 76 of the front portion 64. The front edge 54 of the inflatable curtain 14 extends a relatively short distance between terminal ends of the upper and lower edges 50 and 52, i.e., between the forward edge 72 and bottom edge 74 of the front portion 64. The front edge 54 could, however, be omitted and the upper and lower edges 50 and 52 could be extended until they intersect, in which case the front portion 64 would be partially defined by the intersecting upper and lower edges.

The first connection 80 includes a generally triangular portion 90 adjacent the first end 82 that defines a generally triangular non-inflatable area 92 of the inflatable curtain 14. An upper portion 94 of the triangular portion 90 includes an aperture 96 for receiving a fastening device 100 (FIG. 2), such as a clamp, for connecting the inflatable curtain 14 and the fill tube 32 to the vehicle 12. The upper portion 94 extends in a generally horizontal direction as viewed in FIG. 4 and is spaced from the perimeter connection 46. The upper portion 94 helps define a pocket 102 for receiving the second end portion 36 (FIG. 2) of the fill tube 32. The pocket 102 surrounds the second end portion 36 of the fill tube 32 and forms a snug fit with the fill tube. The pocket 102 thus helps to position the fill tube 32 in the inflatable curtain 14 and helps to maintain the position of the fill tube relative to the curtain.

The second end 84 (FIG. 4) of the first connection 80 includes a portion 104 that extends in a generally horizontal direction as viewed in FIG. 4 and that is spaced from the perimeter connection 46. A first inflation fluid passage 106 is defined between the portion 104 and the portion of the perimeter connection 46 extending along the lower edge 52 adjacent the portion 104. The first inflation fluid passage 106 provides fluid communication between the main portion 62 and the front portion 64.

The front portion 64 includes a connection 110 that has a three-pronged configuration and that extends in a direction generally diagonally downward and forward in the vehicle 12 as viewed in FIG. 2. The connection 110 (FIG. 4) includes a base portion 112 positioned near the forward edge 72 of the front portion 64. The connection 110 also includes three prong portions, identified at 114, 116, and 118, that extend radially from the base portion 112 towards the bottom edge 74 of the front portion 64. The prong portion 114 positioned closest to the first connection 80 intersects the perimeter connection 46 along the bottom edge 74. The second and third prong portions 116 and 118 are spaced from the bottom edge 74.

The connection 110 helps to define four inflatable chambers 120 in the front portion 64. A first chamber 122 of the front portion 64 extends from the intersection of the forward edge 72 and the rear edge 76 in a direction generally diagonally downward and forward along the rear edge 76 towards the bottom edge 74. A second chamber 124 of the front portion 64 extends from the intersection of the forward edge 72 and the rear edge 76 in a direction generally diagonally downward and forward along the forward edge 72 towards the bottom edge 74. The two innermost chambers 126 extend from the base portion 112 of the connection 110 in a direction generally diagonally downward and forward towards the bottom edge 74 of the front portion 64.

Each of the chambers 120 of the front portion 64 has a generally tapered configuration including a narrow portion 134 and an opposite wide portion 136. The narrow portion 134 of each chamber 120 is positioned towards the intersection of the forward edge 72 and the rear edge 76 of the front portion. The wide portion 136 of each chamber 120 is positioned towards the bottom edge 74 of the front portion 64. The chambers 120 are thus oriented such that the tapered configuration of the chambers coincides with the triangular configuration of the front portion 64.

The inflatable curtain 14 includes a plurality of fastener receiving apertures 130 spaced along the forward edge 72 of the front portion 64 of the curtain. The fastener receiving apertures 130 extend through the perimeter connection 46. The perimeter connection 46 may be wide along the forward edge 72 in order to accommodate the apertures 130. Each of the fastener receiving apertures 130 receives a fastener 132 (FIG. 2), such as a bolt or screw, for helping to connect the inflatable curtain 14 to the vehicle 12. More specifically, the fasteners 132 connect the front portion 64 of the inflatable curtain 14 to the A-pillar 22 of the vehicle 12.

The main portion 62 (FIG. 4) of the inflatable curtain 14 includes four middle connections 140. The middle connections 140 are generally arc-shaped, concentric, and are positioned facing concavely downward, as viewed in FIG. 4, toward the lower edge 52 of the inflatable curtain 14. A first middle connection 142 includes a portion 144 that extends towards the upper edge 50 of the inflatable curtain 14 in the area proximate the apex of the arc-shaped first middle connection. The portion 144 defines a non-inflatable area 146 of the inflatable curtain 14. The portion 144 may also include an aperture 96 for receiving a fastening device 100 (FIG. 2) for connecting the inflatable curtain 14 and the fill tube 32 to the vehicle 12.

The middle connections 140 (FIG. 4) help to define three inflatable middle chambers 150 located in the main portion 62 of the inflatable curtain 14. The middle chambers 150 are generally arc-shaped, concentric, and are positioned facing concavely downward, as viewed in FIG. 4, toward the lower edge 52 of the inflatable curtain 14. Each of the middle chambers 150 includes first and second inflation fluid inlets 152 and 154, respectively. The first and second inflation fluid inlets 152 and 154 are positioned at opposite ends of the middle chambers 150 and near the lower edge 52 of the inflatable curtain 14. None of the first and second inflation fluid inlets 152 and 154 is positioned near the upper edge 50 of the inflatable curtain 14.

The inflatable curtain 14 also includes a front connection 160 located in the main portion 62 of the curtain. The front connection 160 includes an upper end portion 162, a lower end portion 164 and a middle portion 166 that extends between the upper and lower end portions. The upper end portion 162 is positioned near the upper edge 50 of the inflatable curtain 14 and extends in a generally horizontal direction, as viewed in FIG. 4. The upper end portion 162 may include an aperture 96 for receiving a fastening device 100. The lower end portion 164 is positioned near the lower edge 52 of the inflatable curtain 14 and extends in a generally horizontal direction, as viewed in FIG. 4, towards the middle connections 150. The middle portion 166 of the front connection 160 extends generally diagonally between the upper and lower end portions 162 and 164.

The front connection 160, perimeter connection 46, and the first middle connection 142 help to define two inflatable front chambers 170 located in the main portion 62 of the inflatable curtain 14. The front chambers 170 extend in a generally diagonal direction between the upper and lower edges 50 and 52 of the inflatable curtain 14. Each of the front chambers 170 includes an inflation fluid inlet 172 positioned near the upper edge 50 of the inflatable curtain 14 and an inflation fluid outlet 174 positioned near the lower edge 52 of the curtain.

The inflatable curtain 14 also includes a rear connection 190 located in the main portion 62 of the curtain. The rear connection 190 includes an upper end portion 192, a lower end portion 194 and a middle portion 196 that extends between the upper and lower end portions. The upper end portion 192 is spaced from the upper edge 50 of the inflatable curtain 14 and includes a portion that extends generally parallel to the upper edge of the curtain. The upper end portion 192 intersects or coincides with the perimeter connection 46 along the rear edge 56 of the inflatable curtain 14. The upper end portion 192 may include an aperture 96 for receiving a fastening device 100. The middle portion 196 of the rear connection 190 extends generally diagonally between the upper and lower end portions 192 and 194.

The rear connection 190, perimeter connection 46, and the first middle connection 142 help to define first and second inflatable rear chambers 200 and 202, respectively, located in the main portion 62 of the inflatable curtain 14. The first and second rear chambers 200 and 202 extend in a generally diagonal direction between the upper and lower edges 50 and 52 of the inflatable curtain 14. The first rear chamber 200 includes an inflation fluid inlet 204 positioned near the upper edge 50 of the inflatable curtain 14 and an opposite inflation fluid outlet 206. The second rear chamber 202 includes an inflation fluid inlet 208.

The inflatable curtain 14 also includes a bottom chamber 210 that extends along the lower edge 52 of the curtain in the main portion 62 of the curtain. The bottom chamber 210 is in fluid communication with the front chambers 170, middle chambers 150, first and second rear chambers 200 and 202, and the front portion 64 of the inflatable curtain 14.

The inflatable curtain 14 further includes an opening 212 for receiving the first end portion 34 of the fill tube 32. The opening 212 is defined between the perimeter connection 46 and the upper portion 192 of the rear connection 190 near the intersection of the rear edge 56 and the upper edge 50 of the inflatable curtain 14. The opening 212 receives the fill tube 32 when the fill tube is inserted into the inflatable curtain 14. When the fill tube 32 is fully inserted in the inflatable curtain 14, the portions of the curtain that define the opening 212 encircle the first end portion 34 of the fill tube 32 and form a snug fit with the fill tube. The opening 212 thus helps to position the fill tube 32 in the inflatable curtain 14 and helps to maintain the position of the fill tube relative to the curtain.

The upper end portion 162 of the front connection 160 and the portion 144 of the first middle connection 140 are spaced from the upper edge 50 of the inflatable curtain 14 a distance slightly larger than the diameter of the fill tube 32. The upper end portion 162 and the portion 144 thus help guide the fill tube 32 into the inflatable curtain 14 when the tube is inserted into the curtain. The upper end portion 162 and the portion 144 also help to position the fill tube 32 in the inflatable curtain 14 and help to maintain the position of the fill tube relative to the curtain.

Referring to FIG. 2, the apparatus 10 may include an anchor mechanism 260 for helping to connect the inflatable curtain 14 to the vehicle 12. In the embodiment illustrated in FIG. 2, the anchor mechanism 260 connects the inflatable curtain 14 to the C pillar 26 of the vehicle 12. The anchor mechanism 260 includes a track 262 connected to the C pillar 26 that extends generally vertically or at a substantially vertical angle along the C pillar. The anchor mechanism 260 also includes an element 264 that is slidable along the track. A flexible elongated member 266, such as a tether, has a first end connected to the element 264 and an opposite second end connected to the inflatable curtain 14 adjacent the lower edge 52 of the curtain near the intersection of the lower edge and the rear edge 56 of the curtain.

The vehicle 12 includes a sensor mechanism 270 (shown schematically in FIGS. 1 and 2) for sensing a side impact to the vehicle 12 and/or a rollover of the vehicle 12. The sensor mechanism 270 actuates the inflator 30 in response to the sensing of a side impact or a vehicle rollover.

In the event of a rollover of the vehicle 12 or a side impact to the vehicle for which actuation of the curtain 14 is desired to help protect a vehicle occupant, the sensor mechanism 270 provides an electrical signal over lead wires 272 to the inflator 30. The electrical signal causes the inflator 30 to be actuated in a known manner. The inflator 30 discharges fluid under pressure into the fill tube 32. The fill tube 32 directs the fluid into the main portion 62 of the inflatable curtain 14.

The inflatable curtain 14 inflates under the pressure of the inflation fluid from the inflator 30. The inflatable curtain 14 inflates away from the roof 18 in a downward direction as shown in the drawings and in a downward direction with respect to the direction of forward travel of the vehicle 12 into the position illustrated in FIG. 2.

The inflatable curtain 14, when inflated, extends along the side structure 16 of the vehicle 12 and is positioned between the side structure and any occupant of the vehicle. When the inflatable curtain 14 is in the inflated condition, the first panel 40 (FIG. 3) is positioned adjacent the side structure 16 of the vehicle 12. The upper edge 50 (FIG. 2) of the inflatable curtain 14 is positioned adjacent the intersection of the roof 18 and the side structure 16 of the vehicle 12. The front edge 54 of the inflatable curtain 14 is positioned adjacent the A pillar 22 of the vehicle 12. The rear edge 56 of the inflatable curtain 14 is positioned adjacent the C pillar 26 of the vehicle 12. The inflatable curtain 14 extends between the A pillar 22 and the C pillar 26 of the vehicle 12 and may overlie portions of the A pillar, C pillar, and B pillar 24 of the vehicle.

It will be recognized by those skilled in the art that the inflatable curtain may have alternative configurations. For example, in the illustrated embodiment, the inflatable curtain 14 extends between the A pillar 22 and the C pillar 26 of the vehicle 12. The inflatable curtain 14 could, however, extend between the A pillar 22 and the B pillar 24 only or between the B pillar and the C pillar 26 only. Also, the inflatable curtain 14 could extend between the A pillar 22 and the D pillar 28 of the vehicle 12.

The inflatable curtain 14, when inflated, helps to protect a vehicle occupant in the event of a vehicle rollover or a side impact to the vehicle 12. The connections 70 help to limit the thickness of the inflated inflatable curtain 14 and help to reduce the overall volume of the curtain. The front chambers 170 (FIG. 4), middle chambers 150, rear chambers 200 and 202, and bottom chamber 210 of the main portion 62, when inflated, help to absorb the energy of impacts with the inflatable curtain 14 and help to distribute the impact energy over a large area of the curtain. The chambers 120 of the front portion 64 also help to absorb the energy of impacts with the inflatable curtain 14 and help to distribute the impact energy over a large area of the curtain.

As the inflatable curtain 14 is inflated, inflation fluid is directed from the fill tube 32 into the main portion 62 of the curtain. The inflation fluid is directed into the front chambers 170 through the inflation fluid inlets 172 and into the first rear chamber 200 through the inflation fluid inlet 204. The inflation fluid inflates the front chambers 170 and the first rear chamber 200 and then exits the chambers through the inflation fluid outlets 174 and 206, respectively. When the inflation fluid exits the front chambers 170 and the first rear chamber 200, the fluid is directed into the bottom chamber 210 and through the first and second inflation fluid inlets 152 and 154 into the middle chambers 150. Inflation fluid is also directed through the inflation fluid inlet 208 into the second rear chamber 202.

Inflation fluid is also directed from the bottom chamber 210 into the front portion 64 through the first inflation fluid passage 106. The inflation fluid enters the front portion 64 and inflates the chambers 120 of the front portion. In the embodiment illustrated in FIGS. 1–4, the outermost chambers 122 and 124 of the front portion 64 are inflated before the innermost chambers 126 of the front portion are inflated.

The chambers 120 of the front portion 64, when inflated, expand radially, which causes the front portion to contract in a direction perpendicular to the length of the chambers, i.e., in a direction generally along the length of the inflatable curtain 14. The degree or distance that the chambers contract is related directly to the width of the chambers. The wide portions 136 of the chambers 120 thus contract to a greater degree or distance than the narrow portions 134 of the chambers. The front portion 64, when inflated, experiences the greatest amount of contraction along the bottom edge 74 because the wide portions 136 of the chambers 120 are positioned adjacent the bottom edge.

The front portion 64, when inflated, thus contracts lengthwise, i.e., along the length of the inflatable curtain 14 as measured in a generally horizontal direction, as viewed in FIG. 2. The inflatable curtain 14, being connected to the A pillar 22 via the fasteners 132 and being connected to the C pillar 26 via the anchor mechanism 260, is thus tensioned between the A pillar and C pillar when the front portion 64 contracts lengthwise. This helps to maintain the inflatable curtain 14 in the inflated position of FIG. 2 throughout the duration of a side impact to the vehicle 12 and/or a vehicle rollover.

In the embodiment illustrated in FIGS. 1–4, the front portion 64 begins to inflate after the main portion 62 begins to inflate. More specifically, the front chambers 170 and the first rear chamber 200 begin to inflate before the front portion 64 begins to inflate. The rate at which the front portion 64 is inflated depends partially upon the size of the first inflation fluid passage 106, i.e., the distance between the second end 84 of the first connection 80 and the perimeter connection 46. The front portion 64 may thus be inflated at a desired rate by adjusting the first inflation fluid passage 106 to an appropriate size. The main portion 62 may, therefore, be substantially inflated before the front portion 64 is inflated.

As the main portion 62 is inflated, the front chambers 170 and the first rear chamber 200 begin to inflate before the middle chambers 150 begin to inflate. The rate at which the middle chambers 150 inflate depends partially upon the size of the inflation fluid outlets 174 and 206, as well as the size of the inflation fluid inlets 152 and 154. The front chambers 170 and the first rear chamber 200 thus may be substantially inflated before the middle chambers 150 begin to inflate.

Also, as the main portion 62 is inflated, the first rear chamber 200 begins to inflate before the second rear chamber 202 begins to inflate. The rate at which the second rear chamber 202 inflates depends partially upon the size of the inflation fluid outlet 206 and the inflation fluid inlets 208. The first rear chamber 200 thus may be substantially inflated before the second rear chamber 202.

Figure 5:
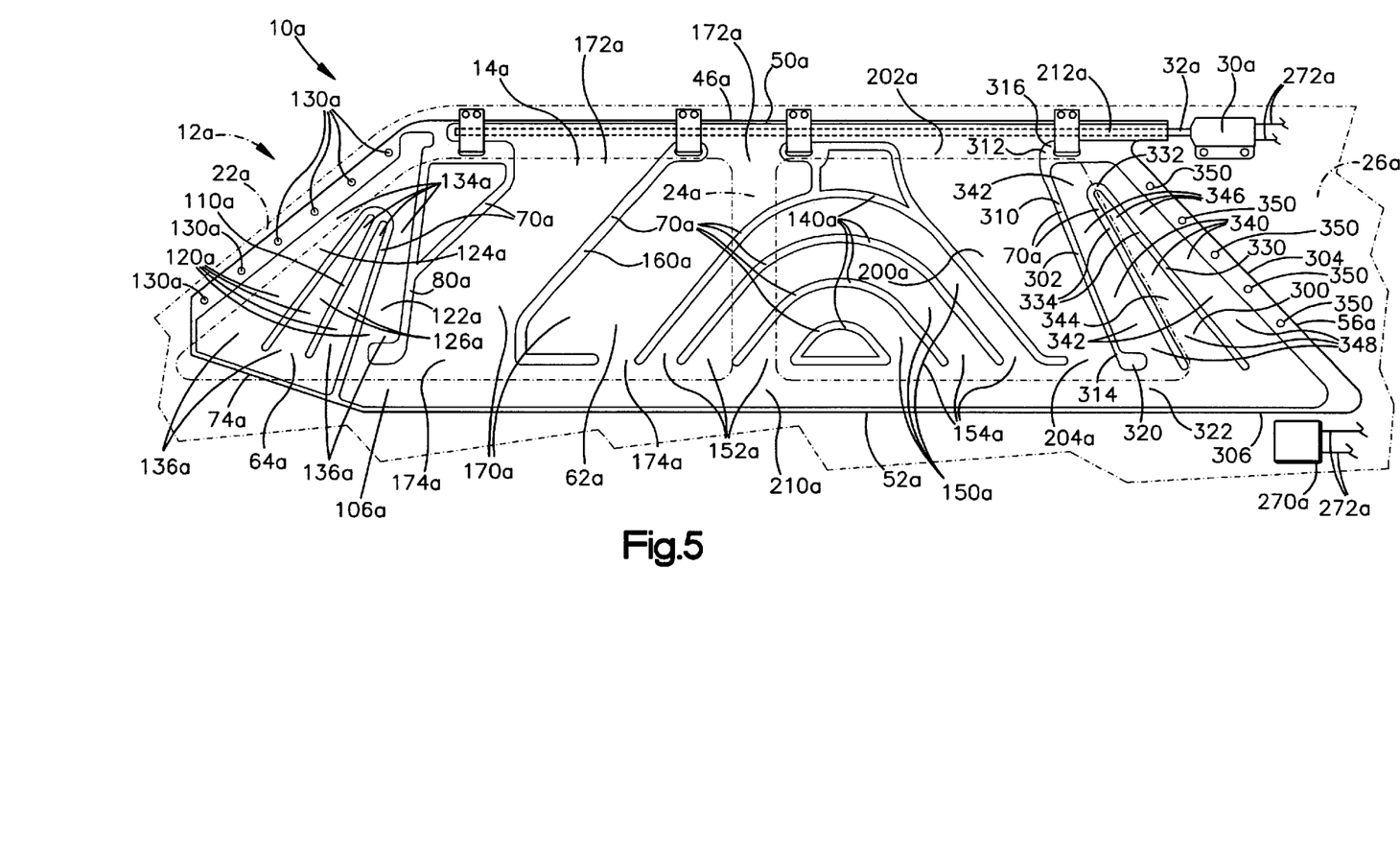
FIG. 5 is a schematic view illustrating an apparatus for helping to protect a vehicle occupant in an inflated condition, according to a second embodiment of the present invention.

A second embodiment of the present invention is illustrated in FIG. 5. The second embodiment of the invention is similar to the first embodiment of the invention illustrated in FIGS. 1–4. Accordingly, numerals similar to those of FIGS. 1–4 will be used in FIG. 5 to identify similar components, the suffix letter "a" being associated with the numerals of FIG. 5 to avoid confusion.

As illustrated in FIG. 5, the inflatable curtain 14a includes an inflatable rear portion 300 in addition to the front portion 64a and main portion 62a. The main portion 62a is thus positioned between the front portion 64a and the rear portion 300. The rear portion 300 has a generally triangular configuration. A forward edge 302 of the rear portion 300 is defined by a second connection 310. A rear edge 304 of the rear portion 300 is defined by the rear edge 56a of the inflatable curtain 14a. A bottom edge 306 of the rear portion 300 is defined by a portion of the lower edge 52a of the inflatable curtain 14a.

The front portion 64a of the inflatable curtain 14a of the second embodiment is identical to the front portion 64 (FIGS. 1–4) of the inflatable curtain 14 of the first embodiment. The main portion 62a (FIG. 5) of the inflatable curtain 14a of the second embodiment is substantially identical to the main portion 64 (FIGS. 1–4) of the first embodiment, except that the rear connection 190 and the second rear chamber 202 have been replaced by the second connection 310 (FIG. 5) and the rear portion 300.

The second connection 310 has a first end 312 and an opposite second end 314. The first end 312 has a portion 316 that is spaced from the upper edge 50a and that intersects the perimeter connection 46a at the rear edge 56a of the curtain 14a. The portion 316 and the perimeter connection 46a define the opening 252a. The second end 314 is spaced from the perimeter connection 46a and positioned near the lower edge 52a. The second connection 310 extends in a generally diagonal direction from the opening 252a towards the lower edge 52a and the rear edge 56a of the inflatable curtain 14a.

The second end 314 of the second connection 300 includes a portion 320 that extends generally parallel to the lower edge 52a and is spaced from the perimeter connection 46a. A second inflation fluid passage 322 is defined between the second end 314 of the first connection 300 and the portion of the perimeter connection 46a extending along the lower edge 52a adjacent the second end 314. The second inflation fluid passage 322 provides fluid communication between the main portion 62a and the rear portion 300.

The rear portion 300 includes a connection 330 that has a generally inverted V-shaped configuration. The connection 330 extends in a direction generally diagonally downward and rearward in the vehicle 12a, as viewed in FIG. 5. The connection 330 includes a base portion 332 and two prong portions 334 that extend from the base portion. The base portion 332 is positioned near the intersection of the forward edge 302 and rear edge 304 of the rear portion 300. The prong portions 334 extend from the base portion towards the bottom edge 306 of the rear portion 300.

The connection 330 helps to define three inflatable chambers 340 of the rear portion 300. Two outermost chambers 342 extend from the intersection of the forward edge 302 and rear edge 304 in a direction generally diagonally downward and rearward towards the bottom edge 306 of the rear portion 300. An innermost chamber 344 extends from the base portion 332 of the connection 330 in a direction generally diagonally downward and rearward towards the bottom edge 306 of the rear portion 300.

Each of the chambers 340 of the rear portion 300 has a generally tapered configuration including a narrow portion 346 and an opposite wide portion 348. The narrow portion 346 of each chamber 340 is positioned towards the intersection of the forward edge 302 and the rear edge 304 of the rear portion 300. The wide portion 348 of each chamber 340 is positioned towards the bottom edge 306 of the rear portion 300. The chambers 340 are thus oriented such that the tapered configuration of the chambers coincides with the triangular configuration of the rear portion 300.

The inflatable curtain 14a includes a plurality of fastener receiving apertures 350 spaced along the rear edge 56a of the curtain. The fastener receiving apertures 350 extend through the perimeter connection 46a. Because of this, the perimeter connection 46a may be wide along the rear edge 56a of the inflatable curtain 14a. The fastener receiving apertures 350 receive fasteners (not shown), such as bolts or screws, for helping to connect the inflatable curtain 14a to the vehicle 12a. More specifically, the fasteners extending through the apertures 350 along the rear edge 56a connect the rear portion 300 to the C pillar 26a of the vehicle 12a.

The first rear chamber 200a of the inflatable curtain 14a is similar to the first rear chamber 200 (FIGS. 1–4) of the first embodiment. The main portion 62a (FIG. 5) of the second embodiment includes four middle connections 140a that help define three inflatable middle chambers 150a of the main portion and a front connection 160a that helps define two inflatable front chambers 170a of the main portion. The front portion 64a (FIG. 5) of the second embodiment includes a connection 110a that defines four inflatable chambers 120a of the front portion. The front portion 64a also includes fastener receiving apertures 130a spaced along the upper edge 50a of the curtain.

In the event of a rollover of the vehicle 12a or a side impact to the vehicle for which actuation of the curtain 14a is desired to help protect a vehicle occupant, the inflator 30a is actuated by the sensor mechanism 270a in a manner similar or identical to the apparatus 10 (FIGS. 1–4) of the first embodiment. The inflator 30a (FIG. 5) discharges fluid under pressure into the fill tube 32a, which directs the fluid into the main portion 62a of the inflatable curtain 14a. The inflatable curtain 14a inflates under the pressure of the inflation fluid from the inflator 30a into the position illustrated in FIG. 5.

The inflatable curtain 14a, when inflated, helps to protect a vehicle occupant in the event of a vehicle rollover or a side impact to the vehicle 12a. The connections 70a help to limit the thickness of the inflated inflatable curtain 14a and help to reduce the overall volume of the curtain. The front chambers 170a, middle chambers 150a, first rear chamber 200a, and bottom chamber 210a of the main portion 62a, when inflated, help to absorb the energy of impacts with the inflatable curtain 14a and help to distribute the impact energy over a large area of the curtain. The chambers 120a of the front portion 64a and the chambers 340 of the rear portion 300 also help to absorb the energy of impacts with the inflatable curtain 14a and help to distribute the impact energy over a large area of the curtain.

As the inflatable curtain 14a is inflated, inflation fluid is directed from the fill tube 32a into the main portion 62a of the curtain. The inflation fluid is directed into the front chambers 170a through the inflation fluid inlets 172a and into the first rear chamber 200a through the inflation fluid inlet 202a. The inflation fluid inflates the front chambers 170a and the first rear chamber 200a and then exits the chambers through the inflation fluid outlets 174a and 204a. When the inflation fluid exits the front chambers 170a and the first rear chamber 200a, the fluid is directed into the bottom chamber 210a and through the first and second inflation fluid inlets 152a and 154a into the middle chambers 150a.

Inflation fluid is also directed from the bottom chamber 210a into the front portion 64a through the first inflation fluid passage 106a and into the rear portion 300 through the second inflation fluid passage 322. Inflation fluid enters the front portion 64a and inflates the chambers 120a of the front portion. Inflation fluid also enters the rear portion 300 and inflates the chambers 340 of the rear portion. In the second embodiment, the outermost chambers 122a and 124a of the front portion 64a are inflated before the innermost chambers 126a of the front portion, whereas the outermost chambers 342 and innermost chamber 344 of the rear portion 300 are inflated at about the same time.

The chambers 120a and 340 of the front and rear portions 64a and 300, respectively, when inflated, expand radially, which causes the chambers to contract in a direction perpendicular to the length of the chambers.

The chambers 120a of the front portion 64a, when inflated, expand radially, which causes the front portion to contract in a direction perpendicular to the length of the chambers, i.e., in a direction generally along the length of the inflatable curtain 14a. The degree or distance that the chambers contract is related directly to the width of the chamber. The wide portions 136a of the chambers 120a thus contract to a greater degree or distance than the narrow portions 134a of the chambers. The front portion 64a, when inflated, experiences the greatest amount of contraction along the bottom edge 74a because the wide portions 136a of the chambers 120a are positioned adjacent the bottom edge.

The chambers 340 of the rear portion 300, when inflated, expand radially, which causes the front portion to contract in a direction perpendicular to the length of the chambers, i.e., in a direction generally along the length of the inflatable curtain 14a. The degree or distance that the chambers contract is related directly to the width of the chamber. The wide portions 348 of the chambers 340 thus contract to a greater degree or distance than the narrow portions 346 of the chambers. The rear portion 300, when inflated, experiences the greatest amount of contraction along the bottom edge 306 because the wide portions 348 of the chambers 340 are positioned adjacent the bottom edge.

The front and rear portions 64a and 300 thus contract lengthwise along the length of the inflatable curtain 14a, as measured in a generally horizontal direction, as viewed in FIG. 5. The inflatable curtain 14a, being connected to the vehicle 12a along the A pillar 22a and the C pillar 26a, is thus tensioned between the A pillar and C pillar when the front and rear portions 64a and 300 contract lengthwise due to the inflation of the chambers 120a and 340. This helps to maintain the inflatable curtain 14a in the inflated position of FIG. 5 throughout the duration of a side impact to the vehicle 12a and/or a vehicle rollover.

In the embodiment illustrated in FIG. 5, the front portion 64a begins to inflate after the main portion 62a begins to inflate. More specifically, the front chambers 170a and the first rear chamber 200a begin to inflate before the front portion 64a begins to inflate. The rate at which the front portion 64a is inflated depends partially upon the size of the first inflation fluid passage 106a, i.e., the distance between the second end 84a of the first connection 80a and the perimeter connection 46a. The front portion 64a may thus be inflated at a desired rate by adjusting the first inflation fluid passage 106a to an appropriate size. The main portion 62a may, therefore, be substantially inflated before the front portions 64a is inflated.

Also, in the embodiment illustrated in FIG. 5, the rear portion 300 begins to inflate after the main portion 62a begins to inflate. More specifically, the front chambers 170a and the first rear chamber 200a begin to inflate before the rear portion 300 begins to inflate. The rate at which the rear portion 300 is inflated depends partially upon the size of the second inflation fluid passage 322, i.e., the distance between the second end 320 of the second connection 310 and the perimeter connection 46a. The rear portion 300 may thus be inflated at a desired rate by adjusting the second inflation fluid passage 322 to an appropriate size. The main portion 62a may, therefore, be substantially inflated before the rear portion 300 is inflated.

As the main portion 62a is inflated, the front chambers 170a and the first rear chamber 200a begin to inflate before the middle chambers 150a begin to inflate. The rate at which the middle chambers 150a inflate depends partially on the size of the inflation fluid outlets 174a and 204a and the size of the inflation fluid inlets 152a and 154a. The front chambers 170a and the first rear chamber 200a may thus be substantially inflated before the middle chambers 150a begin to inflate.

From the above description of the invention, those skilled in the art will perceive improvements, changes and modifications. For example, the front chambers, rear chambers, middle chambers and bottom chamber of the inflatable curtain in the first and second embodiment may be defined by connections having shapes and configurations different than the connections illustrated in the respective embodiments. As a further example, in the illustrated embodiments, separate front, middle and rear connections define the front, middle and rear chambers of the inflatable curtain. The front, middle and rear chambers could, however, be defined by a single connection. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:

an inflatable vehicle occupant protection device that is inflatable away from the vehicle roof into a position between the side structure of the vehicle and a vehicle occupant, said inflatable vehicle occupant protection device comprising an inflatable front portion having a generally triangular configuration and an inflatable main portion positioned rearward of said front portion, said front portion including a forward edge, a rear edge, and a bottom edge, said front portion being in fluid communication with said main portion via a first inflation fluid passage positioned adjacent said bottom edge of said front portion, said front portion comprising a plurality of inflatable chambers, said chambers having a generally tapered configuration with a narrow end and an opposite wide end, said narrow end being positioned near an intersection of said forward edge and said rear edge of said front portion, said wide end being positioned near said bottom edge of said front portion; and an inflation fluid source that is actuatable to provide inflation fluid for inflating said inflatable vehicle occupant protection device, said inflation fluid source when actuated directing inflation fluid into said main portion to inflate said main portion, said first inflation fluid passage directing inflation fluid from said main portion into said front portion to inflate said front portion, said chambers of said front portion when inflated contracting in a direction transverse to the length of said chambers and helping to tension said inflatable vehicle occupant protection device along the length of said inflatable vehicle occupant protection device.

2. Apparatus as recited in claim 1, wherein said inflatable vehicle occupant protection device comprises overlying panels interconnected to form a perimeter connection extending along a perimeter of said inflatable vehicle occupant protection device, said perimeter being at least partially defined by upper and lower edges of said inflatable vehicle occupant protection device, said inflatable vehicle occupant protection device including a first connection interconnecting said overlying panels, said first connection having a first end intersecting said perimeter connection adjacent said upper edge of said inflatable vehicle occupant protection device and an opposite second end spaced from said perimeter connection near said lower edge of said inflatable vehicle occupant protection device, said front portion being positioned forward of said first connection, said main portion being positioned rearward of said first connection, said inflatable vehicle occupant protection device further comprising at least one connection interconnecting said overlying panels within said front portion to define said chambers of said front portion.

3. Apparatus as recited in claim 2, wherein said first inflation fluid passage is defined between said second end of said first connection and said lower edge of said inflatable vehicle occupant protection device.

4. Apparatus as recited in claim 1, wherein said main portion begins to inflate before said front portion begins to inflate.

5. Apparatus as recited in claim 1, wherein said main portion is substantially inflated before said front portion begins to inflate.

6. Apparatus as recited in claim 1, wherein said inflatable vehicle occupant protection device when inflated extends along the side structure of the vehicle between an A pillar and a C pillar of the vehicle.

7. Apparatus as recited in claim 1, wherein said inflatable vehicle occupant protection device, when inflated, overlies at least a portion of an A pillar, a B pillar and a C pillar of the vehicle.

8. Apparatus as recited in claim 1, wherein said forward edge of said front portion is connected to an A pillar of the vehicle.

9. Apparatus as recited in claim 8, wherein said inflatable vehicle occupant protection device has a portion connected to a C pillar of the vehicle, said front portion, when contracted in a direction transverse to said length of said chambers, helping to tension said inflatable vehicle occupant protection device between the A pillar and the C pillar.

10. Apparatus as recited in claim 9, further comprising a slider mechanism for connecting said portion of said inflatable vehicle occupant protection device to the C pillar.

11. Apparatus as recited in claim 2, wherein said inflatable vehicle occupant protection device includes at least one middle connection interconnecting said overlying panels within said main portion, said at least one middle connection helping to define at least one inflatable front chamber of said main portion, at least one inflatable rear chamber of said main portion, and at least one inflatable middle chamber of said main portion located between said at least one front chamber and said at least one rear chamber, said at least one front chamber and said at least one rear chamber each having an inflation fluid inlet positioned near said upper edge of said inflatable vehicle occupant protection device and an inflation fluid outlet located near said lower edge of said inflatable vehicle occupant protection device, said at least one middle chamber having at least one inflation fluid inlet positioned near said lower edge of said inflatable vehicle occupant protection device, said at least one middle chamber being free from inflation fluid inlets near said upper edge of said inflatable vehicle occupant protection device, said inflation fluid inlets of said front and rear chambers directing inflation fluid from said inflation fluid source into said front and rear chambers, said inflation fluid outlets of said front and rear chambers directing inflation fluid from said front and rear chambers into said at least one inflation fluid inlet of said at least one middle chamber to inflate said at least one middle chamber.

12. Apparatus as recited in claim 11, wherein said at least one front chamber and said at least one rear chamber begin to inflate before said at least one middle chamber begins to inflate.

13. Apparatus as recited in claim 11, wherein said at least one front chamber and said at least one rear chamber are substantially inflated before said at least one middle chamber begins to inflate.

14. Apparatus as recited in claim 11, wherein said at least one middle connection comprises at least one front connection that helps to define said at least one front chamber and at least one rear connection that helps to define said at least one rear chamber.

15. Apparatus as recited in claim 11, wherein said at least one middle chamber is arc-shaped and positioned facing concavely downward toward said lower edge of said inflatable vehicle occupant protection device when said inflatable vehicle occupant protection device is inflated, said at least one middle chamber having first and second opposite ends with respective first and second inflation fluid inlets positioned near said lower edge of said inflatable vehicle occupant protection device.

16. Apparatus as recited in claim 1, wherein said inflatable vehicle occupant protection device is an inflatable curtain having a stored position extending along the side structure adjacent a roof of the vehicle.

17. Apparatus as recited in claim 16, further including a fill tube in fluid communication with said main portion of said inflatable vehicle occupant protection device, said inflation fluid source being in fluid communication with said fill tube, said inflation fluid source, when actuated, providing inflation fluid to said fill tube, said fill tube directing said inflation fluid into said main portion of said inflatable vehicle occupant protection device to inflate said inflatable vehicle occupant protection device.

18. Apparatus as recited in claim 1, wherein said inflatable vehicle occupant protection device comprises an inflatable rear portion of said inflatable vehicle occupant protection device, said rear portion having a generally triangular configuration, said main portion of said inflatable vehicle occupant protection device being positioned between said front and rear portions, said rear portion including a forward edge, a rear edge, and a bottom edge, said rear portion being in fluid communication with said main portion via a second inflation fluid passage positioned adjacent said bottom edge of said rear portion,     said rear portion comprising a plurality of inflatable chambers, said chambers having a generally tapered configuration with a narrow end and an opposite wide end, said narrow end being positioned near an intersection of said forward edge and said rear edge of said rear portion, said wide end being positioned near said bottom edge of said rear portion,     said inflation fluid source when actuated directing inflation fluid into said main portion to inflate said main portion, said second inflation fluid passage directing inflation fluid from said main portion into said rear portion to inflate said rear portion, said chambers of said rear portion when inflated contracting in a direction transverse to the length of said chambers and helping to tension said inflatable vehicle occupant protection device along the length of said inflatable vehicle occupant protection device.

19. Apparatus as recited in claim 18, wherein said inflatable vehicle occupant protection device includes a second connection interconnecting said overlying panels, said second connection having a first end intersecting said perimeter connection adjacent said upper edge of said inflatable vehicle occupant protection device and an opposite second end spaced from said perimeter connection near said lower edge of said inflatable vehicle occupant protection device, said rear portion being positioned rearward of said second connection, said main portion of said inflatable vehicle occupant protection device being positioned forward of said second connection.

20. Apparatus as recited in claim 19, wherein said second inflation fluid passage is defined between said second end of said second connection and said lower edge of said inflatable vehicle occupant protection device.

21. Apparatus as recited in claim 18, further comprising at least one connection interconnecting said overlying panels within said rear portion to help define said chambers of said rear portion.

22. Apparatus as recited in claim 18, wherein said main portion begins to inflate before said rear portion begins to inflate.

23. Apparatus as recited in claim 18, wherein said main portion is substantially inflated before said rear portion begins to inflate.

24. Apparatus as recited in claim 18, wherein said inflatable vehicle occupant protection device when inflated extends along the side structure of the vehicle between an A pillar and a C pillar of the vehicle.

25. Apparatus as recited in claim 18, wherein said inflatable vehicle occupant protection device, when inflated, overlies at least a portion of an A pillar, a B pillar and a C pillar of the vehicle.

26. Apparatus as recited in claim 18, wherein said forward edge of said front portion is connected to an A pillar of the vehicle and said rear edge of said rear portion is connected to a C pillar of the vehicle.

27. Apparatus for helping to protect an occupant of a vehicle that has a side structure and a roof, said apparatus comprising:

an inflatable vehicle occupant protection device that is inflatable away from the vehicle roof into a position between the side structure of the vehicle and a vehicle occupant, said inflatable vehicle occupant protection device comprising an upper edge, an opposite lower edge, and inflatable front and rear portions spaced away from each other and extending between said upper and lower edges, said front portion comprising a forwardmost inflatable portion of said inflatable vehicle occupant protection device and said rear portion comprising a rearwardmost inflatable portion of said inflatable vehicle occupant protection device, said inflatable vehicle occupant protection device further comprising an inflatable main portion positioned between said front and rear portions and extending between said upper and lower edges, said inflatable vehicle occupant protection device further comprising a first inflation fluid passage that provides fluid communication between said main portion and said front portion and a second inflation fluid passage that provides fluid communication between said main portion and said rear portion, said first and second inflation fluid passages being positioned adjacent said lower edge of said inflatable vehicle occupant protection device;

an inflation fluid source that is actuatable to provide inflation fluid for inflating said inflatable vehicle occupant protection device; and     a fill tube having a first end portion connected to said inflation fluid source and an opposite second end disposed in said inflatable vehicle occupant protection device, said fill tube providing fluid communication between said inflation fluid source and said main portion,     said inflation fluid source when actuated directing inflation fluid into said main portion via said fill tube to inflate said main portion, said inflation fluid being directed from said main portion into said front portion through said first inflation fluid passage to inflate said front portion, said inflation fluid being directed from said main portion into said rear portion through said second inflation fluid passage to inflate said rear portion.

28. Apparatus for helping to protect an occupant of a vehicle that has a side structure and a roof, said apparatus comprising:

an inflatable vehicle occupant protection device that is inflatable away from the vehicle roof into a position between the side structure of the vehicle and a vehicle occupant, said inflatable vehicle occupant protection device comprising overlying panels interconnected to form a perimeter connection extending along a perimeter of said inflatable vehicle occupant protection device, said perimeter being at least partially defined by upper and lower edges of said inflatable vehicle occupant protection device and front and rear edges spaced apart along said upper and lower edges;

an inflation fluid source that is actuatable to provide inflation fluid for inflating said inflatable vehicle occupant protection device; and     a fill tube having a first end portion connected to said inflation fluid source and an opposite second end disposed in said inflatable vehicle occupant protection device,     said inflatable vehicle occupant protection device comprising an inflatable front portion having a generally triangular configuration, an inflatable rear portion having a generally triangular configuration and an inflatable main portion positioned between said front and rear portions, said front portion being partially defined by said front edge of said inflatable vehicle occupant protection device, said rear portion being partially defined by said rear edge of said inflatable vehicle occupant protection device, said inflatable vehicle occupant protection device including first and second inflation fluid passages positioned adjacent a lower edge of said inflatable vehicle occupant protection device, said first inflation fluid passage providing fluid communication between said front portion and said main portion, said second inflation fluid passage providing fluid communication between said rear portion and said main portion said inflation fluid source when actuated directing inflation fluid into said main portion via said fill tube to inflate said main portion, said inflation fluid being directed from said main portion into said front portion through said first inflation fluid passage to inflate said front portion, said inflation fluid being directed from said main portion into said rear portion through said second inflation fluid passage to inflate said rear portion.

29. Apparatus for helping to protect an occupant of a vehicle that has a side structure and a roof, said apparatus comprising:

an inflatable vehicle occupant protection device that is inflatable away from the vehicle roof into a position between the side structure of the vehicle and a vehicle occupant and an inflation fluid source for providing inflation fluid for inflating said inflatable vehicle occupant protection device;

said inflatable vehicle occupant protection device including an inflatable main portion and an inflatable first portion, said first portion including a plurality of adjacent inflatable chambers, each of said inflatable chambers having a tapered configuration with a narrow portion positioned toward an upper edge of said inflatable vehicle occupant protection device and a widened portion positioned toward a lower edge of said inflatable vehicle occupant protection device, said inflation fluid source when actuated providing inflation fluid for inflating said first portion and said main portion, said inflation fluid for inflating said first portion being directed into said first portion from said main portion through an inflation fluid passage positioned adjacent said lower edge of said inflatable vehicle occupant protection device.

* * * * *